June 17, 1930. E. R. MARSTERS 1,764,738
CASTING DEVICE FOR LIVE BAIT
Filed May 22, 1929
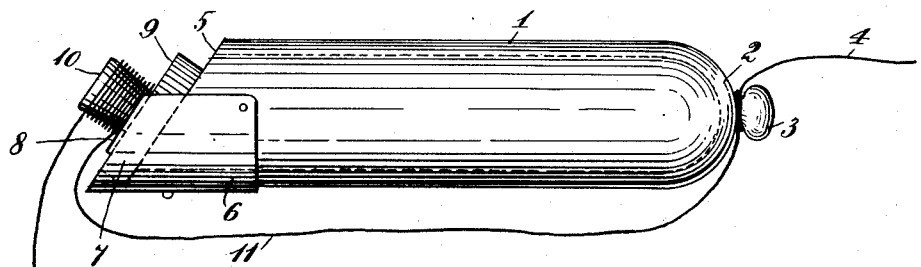
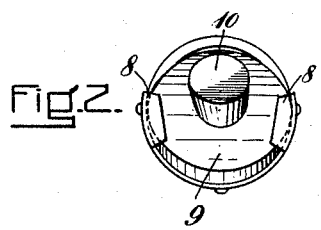
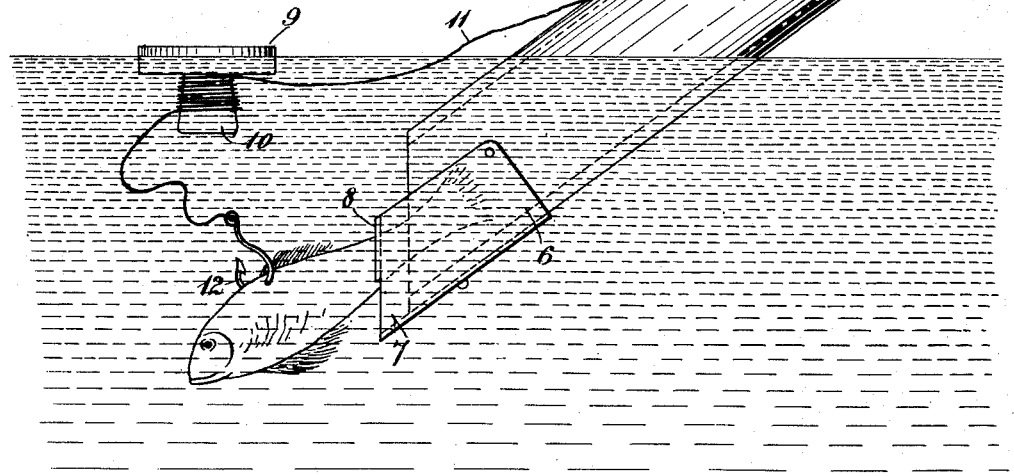
INVENTOR:
Ernest R. Marsters
BY John E. R. Hayes
ATTORNEY:

Patented June 17, 1930

1,764,738

UNITED STATES PATENT OFFICE

ERNEST R. MARSTERS, OF ARLINGTON, MASSACHUSETTS

CASTING DEVICE FOR LIVE BAIT

Application filed May 22, 1929. Serial No. 365,034.

The object of the invention is to provide a casing in the nature of a floatable hollow plug within which the bait may be contained and cast and afterward the bait be released from the plug, then functioning as a float, and allowed to reach such depth in the water beneath the float as will be permitted by a determinate length of line attached to the plug or float; in other words, to provide not only a plug for carrying and releasing the bait, but to provide also for carrying a determinate length of wound line to which the bait is attached and which may become released to unwind and hang suspended from the plug thus functioning as a float, thus enabling the bait to swim around at a determinate depth below the float, it sometimes being desirable that fishing be done in relatively deep water which requires considerable length of line below the float.

The invention can best be seen and understood by reference to the drawings in which—

Fig. 1 is a side elevation of the device with the bait contained within it preparatory to casting.

Fig. 2 is a plan of a portion of the device afterward to be referred to as the cover or auxiliary float, and Fig. 3 is a view mainly in side elevation of the different parts of the device showing the manner of their operation.

Referring to the drawings:

1 represents the hollow casing or plug generally tubular in form and the inner end 2 of which is closed and provided on its exterior with a boss or attaching member 3 by which a line 4 may be secured to the closed end of the plug for purpose of casting. The forward end of the plug is open and it is preferably provided also at this end with an inclined or beveled face 5.

The casing or plug 1 is of wood or other material lighter than water so that the plug will float when cast into the water. Secured to the forward end of the plug on the under side thereof is an end piece 6 made preferably of metal and providing an overweight for the plug by which the plug when cast or deposited in the water will assume a tipped or inclined position therein substantially as shown in Fig. 3. The end piece 6 is preferably made to extend about half way around the plug and to project also beyond the forward end thereof by an extension 7 which is provided with inturned flanges 8. This flanged extension 7 co-operates with the forward end face 5 of the plug to form a socket for receiving and holding a cover 9 for the open end of the plug. This cover is of wood or other material lighter than water permitting of its floating and extending from its outer face and preferably centrally disposed with relation to the cover is a short post or stud 10 made preferably outwardly flaring. This stud or post, when the cover is in place on the plug, provides a fixture to which may be fastened, and then around which may be wound a line extension 11 which is secured to the line-attaching member 3 of the plug, and to which the hook 12 is attached. The line 11 may be of any determinate length and is preferably an extension of the main line 4 which is secured to the line-attaching member 3 of the plug in such manner as to provide for the line extension 11. To permit of an easy application of the cover to the plug when the line 11 is attached, the line 11 is so tied to the post 10 on the cover that a little slack will be left in the line between the point where it is secured to the post, when the cover is in place, and the point where it makes connection with the rear end of the plug. That portion of the line 11 extending beyond the point where it is attached to the post on the cover is the part thereof which is wound around the post, and to the end of which the hook is secured.

In the fixing of the line in the first instance the main line 4 is first attached to the line-attaching end member 3 on the rear end of the plug in such manner as to leave a line extension 11 of determinate length beyond the point of the attachment of the main line to the plug. The extension 11 thus obtained is first tied to the post 10 on the cover, just so much of the line being used as will enable the cover to be placed on the end of the plug and with little remaining slack. The hook is now attached to the bait and the bait with attached hook is then placed within the chamber of the casing or plug 1. The cover 9 is then applied to the open end of the plug. That portion of the line 11 then lying slack between the point where the line is attached to the post 10 on the cover and its hook-carrying end which is then lying within the casing, is wound around the post 10 until all the slack has been taken up. The plug and all connecting parts are now ready for casting. After the cast has been made the plug will on account of the overweight 6 assume an inclined position in the water substantially as shown in Fig. 3. At this time the cover 9, lighter than the water, will float off the end of the plug permitting the bait to escape from the interior of the plug. Thereupon the pull of the bait on the line 11 will cause it to unwind from the post on the cover which has floated to the surface of the water. It makes no difference what initial position the cover has when it reaches the surface of the water for the pull of the bait will cause it to assume a position as shown in Fig. 3 with the post downwardly projecting so that the line 11 will easily withdraw from it. The length of the line 11 or line extension will determine the depth which the bait may attain in the water. The cover will to a certain extent function as a float after the line has been unwound from its post, but owing to its lightness it will generally be pulled beneath the surface, the plug 1 functioning as the actual float to which the line extension 11 is attached.

Having thus fully described my invention, I claim and desire to secure by Letters Patent of the United States:

1. A bait casting device comprising a floatable hollow plug closed at one end, means whereby a line may be attached to the plug, means whereby the plug will assume a tipped position in water when the plug is cast with the open end thereof having downward extension, a floatable cover for the open end of the plug, means for connecting the cover to the plug whereby it may be borne by the plug when cast and permitted to float from off the end of the plug when in its tipped position as aforesaid, and means whereby a winding of hook-carrying line extension connected to the plug may be borne by the cover during the casting of the plug, and permitted to unwind from the cover after the cover has become released from the end of the plug as aforesaid.

2. A bait casting device comprising a floatable hollow plug closed at one end, means whereby a line may be attached to the plug, means whereby the plug will assume a tipped position in water when the plug is cast with the open end thereof having downward extension, a floatable cover for the open end of the plug, and means for connecting the cover to the plug whereby it may be borne by the plug when cast and permitted to float from off the end of the plug when in its tipped position as aforesaid.

3. A bait casting device comprising a floatable hollow plug closed at one end, means whereby a line may be attached to the plug, means whereby the plug will assume a tipped position in water when the plug is cast with the open end thereof having downward extension, a floatable cover for the open end of the plug, means for connecting the cover to the plug whereby it may be borne by the plug when cast and permitted to float from off the end of the plug when in its tipped position as aforesaid, and means whereby a winding of hook-carrying line extension connected to the plug and to the cover may be borne by the cover during the casting of the plug, and permitted to unwind from the cover after the cover has become released from the end of the plug as aforesaid.

4. A bait casting device comprising a floatable hollow plug closed at one end, means whereby a line may be attached to the plug, means whereby the plug will assume a tipped position in the water when cast with the open end thereof having a downward projection, a floatable cover for the open end of the plug, means for securing the cover to the plug whereby it may be borne by the plug when cast and permitted to float off the end of the plug when in its tipped position as aforesaid, and a post on the cover on which line may be wound and carried during the casting of the plug, but permitted to unwind therefrom when the cover has floated off the end of the plug as aforesaid.

5. A bait casting device comprising a floatable hollow plug closed at one end and presenting a beveled face at its open end, means whereby a line may be attached to the closed end of the plug, a floatable cover for the open end of the plug, a piece attached to the under side of the plug at the forward end thereof providing an overweight, said piece extending part way round the plug with extension forward of the beveled front face of the plug and flanged to provide a casing for said cover, and a post borne by the cover on which line may be wound.

ERNEST R. MARSTERS.